M. T. MILES.
VEHICLE TIRE.
APPLICATION FILED FEB. 14, 1916.
1,251,082.
Patented Dec. 25, 1917.
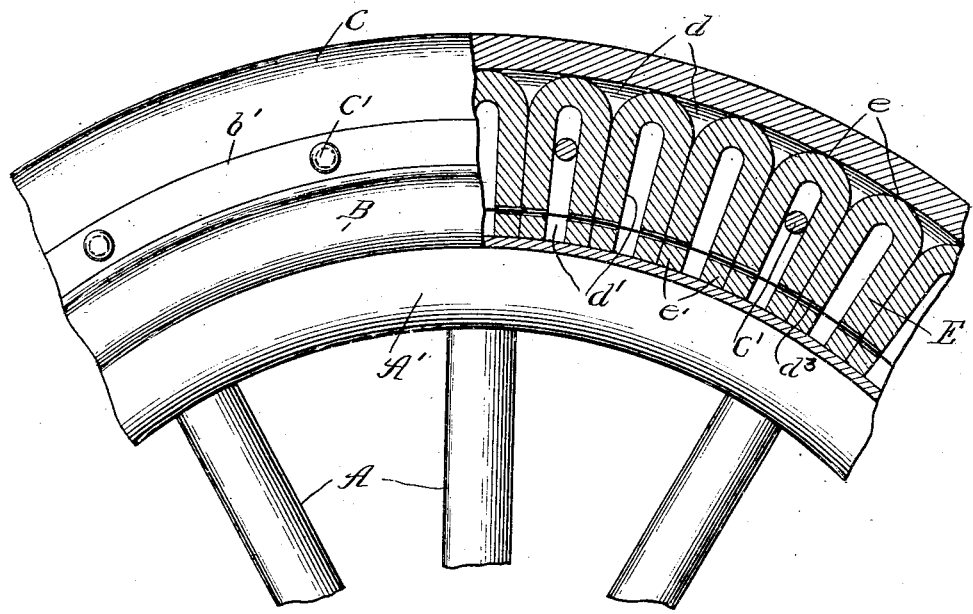
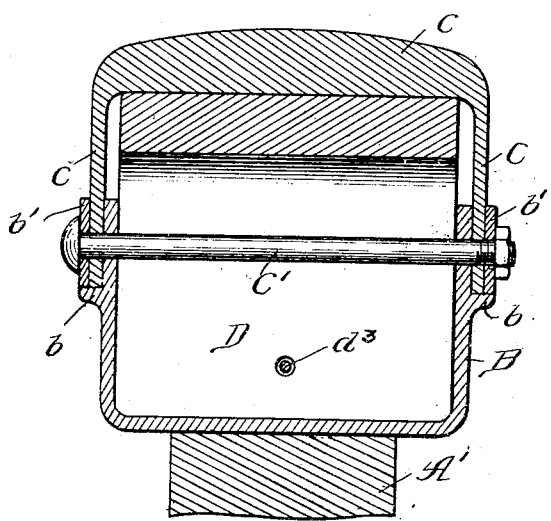
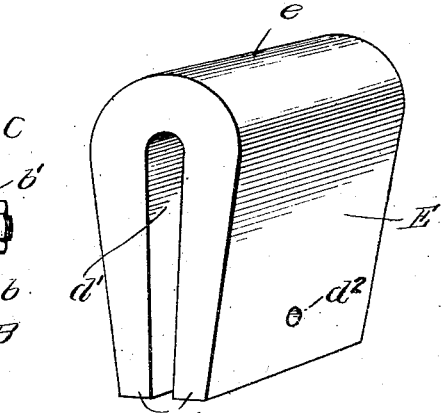
Witness:
R. L. Farrington
Inventor
Marshal T. Miles
By J. Bruce King, Atty.

UNITED STATES PATENT OFFICE.

MARSHAL T. MILES, OF CHICAGO, ILLINOIS.

VEHICLE-TIRE.

1,251,082.  Specification of Letters Patent.  Patented Dec. 25, 1917.

Application filed February 14, 1916. Serial No. 78,307.

*To all whom it may concern:*

Be it known that I, MARSHAL T. MILES, a citizen of the United States, and a resident of Chicago, Cook county, State of Illinois, have invented certain new and useful Improvements in Vehicle-Tires, of which the following, taken in connection with the drawings, is a description.

My invention has for its object the production of a tire for vehicles which shall possess the resiliency of a pneumatic tire, but which does not contain an inner air tube casing which is liable to be affected by punctures, etc.

A further object of my invention is to provide a tire of the class described which is adapted for use on light-weight vehicles or heavy trucks, and which shall be simple in construction and effective in operation.

In the accompanying drawings I have described what I now consider the preferred embodiment of my invention, although it is obvious the details thereof may be carried out in various ways without departing from the spirit of my invention, which consists essentially in providing a series of resilient, flexble, elastic members assembled within an outer casing and adapted to receive any shocks or jolts caused by the wheels of the vehicle traveling over rough or uneven surfaces.

In these drawings,

Figure 1 is a section of a vehicle wheel having my tire applied thereto, a part of the tire casing thereof being broken away to show the construction and arrangement of the springs or resilient members in section;

Fig. 2 is a transverse sectional view of the same;

Fig. 3 is an enlarged perspective view of one of the resilient members.

Referring to the drawings, A represents the spokes of a wheel which are surrounded by a felly A', which is of the usual construction now applied to vehicle wheels.

Surrounding this felly is a tire rim B, preferably formed of metal, which is channel-shaped in cross section, as shown more clearly in Fig. 2.

A shoulder $b$ is formed upon each side of the rim B. Surrounding each shoulder is a circumferential flange or ring $b'$, which extends parallel with the outer edge of the rim B, entirely around the same.

C is the tread of the tire, preferably having a solid cushion surface with elongated side members or flanges $c, c$, which meet the rim B and fit into the grooves formed between the rings $b', b'$, and the sides of the rim B.

A bolt or other fastening device C', extends transversely through the side members of the rim B and the rings $b', b'$, engaging therewith the side members $c, c$, of the tread section C, and securely holding the same in position, as shown more clearly in Fig. 2.

Between the inner walls of the rim B and the tread section C, is formed a chamber D within which is arranged a plurality of flexible, resilient members E. These members are formed preferably or rubber, shaped as shown in Fig. 3, of a single piece of material bent upon itself, the center thereof, $e$, being heavier than the sides and ends thereof, $e'$. These resilient members E, are disposed within the chamber D, extending transversely thereof, as shown more clearly in Fig. 1. The said resilient members are disposed transversely of the chamber D, and extend entirely around the rim of the tire, with the heavy portion thereof against the inner face of the tire tread. $d^2$ is an aperture through the ends of the resilient members, through which is passed a cord, wire, or other securing means $d^3$ when said resilient members are assembled as shown in Fig. 1, the ends of said securing member are fastened together in any well-known manner.

Under pressure of revolution the resilient members are compressed, being crowded into the spaces $d, d$, between the resilient members, and also the space $d'$ at the center of each of the resilient members, the elasticity of the rubber serving to restore said members to their normal position as soon as pressure is removed therefrom.

By this means the tire is given the resiliency of an ordinary pneumatic tire and, as will be observed, is in no wise affected by the puncture of an outer casing or tread.

I claim:

1. In a vehicle tire having a channel-shaped rim, the combination of an oppositely-facing channel-shaped, resilient tread surrounding said rim, means for securing the edges of said rim and tread together forming a chamber therebetween, a plurality of flexible, resilient members substantially U shape in cross section disposed transversely within said chamber and extending entirely around the rim of the tire, said members being heavier at the center than at the sides and ends thereof, substantially as described.

2. In a vehicle tire having a channel-shaped rim, the combination of an oppositely-facing, channel-shaped resilient tread surrounding said rim, means extending transversely of said rim and tread securing the outer edges of the rim and the inner edges of the tread together forming a chamber therebetween, a plurality of flexible, resilient members arranged in said chamber and extending transversely thereof, each of said members formed of a single piece of material bent upon itself in substantially U shape, the center thereof being heavier than the sides and ends, said heavy portion bearing against the inner face of the tread, the thinner end portions of each U-shaped member having apertures therethrough and securing means passing through said apertures circumferentially of the rim, substantially as described.

In testimony whereof I have signed this specification.

MARSHAL T. MILES.